US008823546B2

(12) United States Patent
Myoung et al.

(10) Patent No.: US 8,823,546 B2
(45) Date of Patent: Sep. 2, 2014

(54) AUTOMATIC METER READING SYSTEM AND METHOD FOR UNDERGROUND DISTRIBUTION LINE USING WIRED/WIRELESS COMMUNICATION

(75) Inventors: No-Gil Myoung, Daejeon (KR); Hyo-Yul Choi, Daejeon (KR); Byung-Seok Park, Daejeon (KR); Young-Hyun Kim, Daejeon (KR); In-Ji Choi, Daejeon (KR); Eun-Hye Im, Daejeon (KR); Sang-Youm Lee, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 608 days.

(21) Appl. No.: 13/194,310

(22) Filed: Jul. 29, 2011

(65) Prior Publication Data
US 2012/0026005 A1 Feb. 2, 2012

(30) Foreign Application Priority Data

Jul. 29, 2010 (KR) .......................... 10-2010-0073206

(51) Int. Cl.
*G08B 23/00* (2006.01)
(52) U.S. Cl.
USPC ............ 340/870.02; 340/870.03; 340/870.07; 340/870.11; 340/870.12
(58) Field of Classification Search
CPC ....... G01D 4/004; G01D 4/002; G01D 4/006; G01D 4/008; G01D 21/00; Y02B 90/246; Y04S 20/42; Y04S 20/32; Y04S 20/327; Y04S 20/52; H04B 2203/5441; H04B 2203/5433; H04B 2203/5445; H04B 2203/5479

USPC ................. 340/870.02–870.12, 12.32–12.33, 340/13.23–13.24; 455/426, 466
See application file for complete search history.

(56) References Cited

U.S. PATENT DOCUMENTS

| | | | | |
|---|---|---|---|---|
| 5,748,104 A | * | 5/1998 | Argyroudis et al. ..... | 340/870.11 |
| 6,117,296 A | * | 9/2000 | Thomson ...................... | 204/607 |
| 6,150,955 A | * | 11/2000 | Tracy et al. .............. | 340/870.02 |
| 6,650,249 B2 | * | 11/2003 | Meyer et al. ............. | 340/870.28 |
| 6,943,668 B2 | * | 9/2005 | Gaus et al. ............... | 340/870.02 |
| 7,248,158 B2 | * | 7/2007 | Berkman et al. ............. | 340/538 |
| 7,324,825 B2 | * | 1/2008 | Davis et al. ................ | 455/456.1 |

(Continued)

FOREIGN PATENT DOCUMENTS

| | | |
|---|---|---|
| KR | 10-2009-0011674 | 2/2009 |
| KR | 10-0963793 | 6/2010 |

*Primary Examiner* — Daniel Wu
*Assistant Examiner* — Son M Tang
(74) *Attorney, Agent, or Firm* — McDermott Will & Emery LLP

(57) ABSTRACT

Disclosed herein is an automatic meter reading system for an underground distribution line using wired/wireless communication. The system includes at least one Data Concentration Unit (DCU), at least one Wireless Gathering Unit (WGU), and at least one wireless communication modem. The DCU is installed in a ground transformer, and sends meter reading data to an underground high-voltage distribution line (DL) using a Frequency Division Duplex (FDD) power line communication repeating method. The WGU is installed on a ground rising pipe or at a multi-consumer lead-in wire, and sets up a higher wireless mesh network and a lower wireless mesh network. The wireless communication modem sets up the lower wireless mesh network along with the WGU and the wireless communication modems, gathers the meter reading data, stores the gathered meter reading data, and transfers the stored meter reading data to the DCU through the WGU.

19 Claims, 13 Drawing Sheets

(56) References Cited

U.S. PATENT DOCUMENTS

| | | | |
|---|---|---|---|
| 7,346,347 B2* | 3/2008 | Struhsaker | 455/426.2 |
| 7,385,524 B1* | 6/2008 | Orlosky | 340/870.28 |
| 7,627,453 B2* | 12/2009 | Keefe et al. | 702/182 |
| 7,639,157 B1* | 12/2009 | Whitley et al. | 340/870.02 |
| 7,650,425 B2* | 1/2010 | Davis et al. | 709/238 |
| 7,701,325 B2* | 4/2010 | White, II | 340/870.07 |
| 7,764,943 B2* | 7/2010 | Radtke | 455/402 |
| 7,769,149 B2* | 8/2010 | Berkman | 379/93.01 |
| 7,795,877 B2* | 9/2010 | Radtke et al. | 324/530 |
| 7,969,159 B2* | 6/2011 | Curt et al. | 324/539 |
| 8,090,556 B2* | 1/2012 | Keefe et al. | 702/182 |
| 8,188,855 B2* | 5/2012 | Sharma | 340/538.11 |
| 2004/0203375 A1* | 10/2004 | Chen | 455/41.2 |
| 2007/0223381 A1* | 9/2007 | Radtke | 370/236 |
| 2007/0229295 A1* | 10/2007 | Curt et al. | 340/653 |

\* cited by examiner

AUTOMATIC METER READING SYSTEM AND METHOD FOR UNDERGROUND DISTRIBUTION LINE USING WIRED/WIRELESS COMMUNICATION

CROSS REFERENCE TO RELATED APPLICATION

This application claims the benefit of Korean Patent Application No. 10-2010-0073206, filed on Jul. 29, 2010, which is hereby incorporated by reference in its entirety into this application.

BACKGROUND OF THE INVENTION

1. Field of the Invention

The present invention relates generally to an automatic meter reading system and method for an underground distribution line using wired/wireless communication and, more particularly, to an automatic meter reading system and method for an underground distribution line using wired/wireless communication, which gathers data about the amount of energy used by each consumer in a low-voltage section distributed in broadband over a wireless mesh network, and which sends the data about the amount of energy gathered using Frequency Division Duplex (FDD) power line communication repeating technology capable of long-distance communication between ground transformers in a high-voltage section.

2. Description of the Related Art

The automatic meter reading business is in its early infancy around the world, including Korea. In Korea, the automatic meter reading business for overhead sections has started using a power line communication method in low-voltage sections, and is on its way to achieving, in steps, nationwide automatic meter reading.

FIG. 1 is a diagram illustrating the existing automatic meter reading system for an overhead section. Referring to FIG. 1, the existing automatic meter reading system for an overhead section includes electronic watt-hour meters 10 each configured to include a detachable power line communication modem and installed in a consumer 30, a Data Concentration Unit (DCU) 40 installed on a pole 20 and configured to periodically gather meter reading data from the electronic watt-hour meters 10 of the consumers 30 and send the gathered meter reading data to a neighboring DCU 40 and an FEP/automatic meter reading server 50 and 60 including a customer information database (DB) 65, and the FEP/automatic meter reading server 50 and 60. In the existing automatic meter reading system for an overhead section, a power line communication method, an RF, or a dedicated communication line is used for communication 70 between the DCU 40 and the electronic watt-hour meters 10 of the consumers 30. An RF, a dedicated communication line, or a power line communication method is used for communication 80 between slave and master DCUs 40. A Code Division Multiple Accessing (CDMA) method, a Hybrid Fiber Coaxial (HFC) method, or a digital Trunked Radio System (TRS) method is used for communication 90 between the DCU 40 and the FEP/automatic meter reading server 50 and 60.

Meanwhile, with the recent increase in redevelopment and new city construction (in most new businesses, power is supplied via underground distribution lines), automatic meter reading for the underground section is emerging as an important issue.

Unlike in the overhead section, in the low-voltage line of the underground section, the capacity of a ground transformer (for an underground distribution line) is greater than the capacity of a pole transformer (for a ground distribution line), and therefore a single ground transformer is configured to supply power to the low-voltage consumers for up to about 500 families (about 100 to 300 low-voltage consumers). Furthermore, power line communication performance is degraded because of a wide power supply service area extending from the ground transformer to the consumers, power lines buried underground between the ground transformer and the consumers, a plurality of ground joint boxes, and multi-bifurcation on the ground rising pipe for supplying power to multi-consumer apartments. Moreover, it is impossible to immediately deal with power line communication failure because of the power lines buried underground.

For these reasons, there is a need for an effective communication method for automatic meter reading in the underground low-voltage section and for a method of efficiently obtaining data about the amount of energy using from the consumers of a maximum of 500 families over the shortest period of time.

For an overhead section high-voltage line, the deployment of a communication line, such as a coaxial cable, is easy because there are no obstacles between poles. If a wireless method is used, the desired wireless communication performance can be anticipated because Line Of Sight (LOS) can be guaranteed by attaching an antenna to the top of the pole.

For an underground high-voltage DL, however, from an economic standpoint, it is impossible in practice to deploy additional underground communication lines. Even if a wireless method is used between the ground transformers, a sufficient LOS environment cannot be provided because of the installation of an antenna at a low position and the installation of the ground transformers at locations in paths where there is a lot of vehicle and people traffic, if the distance between the ground transformers is long. Accordingly, desired wireless communication performance cannot be achieved in an underground high-voltage DL.

SUMMARY OF THE INVENTION

Accordingly, the present invention has been made keeping in mind the above problems occurring in the prior art, and an object of the present invention is to provide an effective automatic meter reading system and method for an underground distribution line, which sends meter reading data in an underground high-voltage section using a power line communication method using a high-voltage power line itself as a communication line and using an FDD repeating method capable of long-distance transmission in the underground high-voltage section, and which sends meter reading data in an underground low-voltage section using wireless mesh network technology in which a wide service coverage is provided using multi-hop communication and network recovery reliability is provided using self-healing and self-organization functions in case of a network failure.

In order to achieve the above object, there is provided an automatic meter reading system for an underground distribution line using wired/wireless communication, the system including at least one Data Concentration Unit (DCU) installed in a ground transformer, and configured to send meter reading data, obtained from an electronic meter of each consumer, to an underground high-voltage distribution line (DL) using a Frequency Division Duplex (FDD) power line communication repeating method; at least one Wireless Gathering Unit (WGU) installed on a ground rising pipe or at a multi-consumer lead-in wire, and configured to set up a higher wireless mesh network along with the DCU and to set up a lower wireless mesh network along with wireless communication modems mounted on electronic meters of neighboring consumers; and at least one wireless communication modem configured to set up the lower wireless mesh network along with the WGU and the wireless communication modems mounted on the electronic meters of the neighboring consumers, to gather the meter reading data while periodically communicating with the electronic meters of the neighboring consumers, to store the gathered meter reading data, and to transfer the stored meter reading data to the DCU through the WGU when the DCU requests the meter reading data.

The DCU may include a low-voltage DL communication network module for obtaining the meter reading data about each of the consumers over the higher and lower wireless mesh networks; a microcontroller for performing control so that the meter reading data obtained through the low-voltage DL communication network module is converted into a single frame and the converted meter reading data is sent to the underground high-voltage DL; and a high-voltage DL communication network module for sending the converted meter reading data to the underground high-voltage DL via a neutral line or at least one of R, S, and T-phase lines in the underground high-voltage DL under a control of the microcontroller.

The microcontroller may calculate the total amount of supplied power on a to secondary side of the ground transformer based on a current and voltage values obtained from the secondary side of the ground transformer, and monitor power loss and surreptitious use of electricity by comparing the total amount of supplied power with a total amount of power used by the consumers and obtained through the WGU.

The microcontroller may include a DLMS/COSEM-based meter reading protocol engine, and periodically request the meter reading data from the wireless communication modem.

The automatic meter reading system may further include a metering module for calculating active power, reactive power, a power factor, apparent power, and a load profile (LP) based on a current value and a voltage value obtained from a secondary side of the ground transformer; and a power supply module for generating a DC voltage or a DC current necessary for operation using power received from the secondary side of the ground transformer, and detecting the current and voltage values of the secondary side of the ground transformer.

The high-voltage DL communication network module may include a high-voltage power line communication module each for performing a Digital Signal Processing (DSP) function for managing a high-voltage DL communication network, an Ethernet bridge function, power line communication modulation and demodulation, and an FDD repeating function; and an AFE each for blocking power supplied through a neutral line or at least one of R, S, and T-phase lines of the underground high-voltage DL and injecting, extracting, and amplifying only a power line communication signal.

The automatic meter reading system may further include an FEP/server association communication network module for receiving the meter reading data from the microcontroller, and sending the meter reading data to an FEP/automatic meter reading server using one or more of a WiBro module, a CDMA module, and a cable modem.

The low-voltage DL communication network module may include a plurality of wireless communication units for receiving the meter reading data from the one or more WGUs, installed on a neighboring ground rising pipe or at a neighboring multi-consumer lead-in wire, using a dual polarization antenna that supports MIMO; and a Network Processing Unit (NPU) for transferring the meter reading data of the plurality of wireless communication units to the microcontroller, and supporting IEEE 15.4, IEEE 802.11s, IEEE 802.11e, and IEEE 802.11a/b/g/n protocols.

The WGU may include a power supply module for generating a DC voltage or a DC current necessary for operation using power received from the ground rising pipe or the multi-consumer lead-in wire, and detecting analog current and voltage values on the ground rising pipe or at the multi-consumer lead-in wire; and a metering module for converting the analog current and voltage values, detected by the power supply module, into digital current and voltage values, and calculating active power, reactive power, a power factor, apparent power, and a load profile (LP) based on the converted current and the voltage values.

The automatic meter reading system may further include a Network Processing Unit (NPU) for calculating a total amount of supplied power on the ground rising pipe or at the multi-consumer lead-in wire based on the current and voltage values converted by the metering module, calculating a total amount of power used based on an amount of power used which is obtained from the wireless communication modems belonging to the lower wireless mesh network, and monitoring power loss and surreptitious use of electricity by comparing the total amount of supplied power calculated with the total amount of power used.

The automatic meter reading system may further include a non-contact type coupler installed in the underground high-voltage DL and configured to support FDD power line communication repeating of the DCU.

A T connector may be attached to a communication terminal of the non-contact type coupler in order to simultaneously inject power line communication signals in different frequency bands.

The DCU may include a magnet attached to an iron structure of the inside of the ground transformer.

In order to achieve the above object, there is provided an automatic meter reading method for an underground distribution line using wired/wireless communication, the method including gathering meter reading data while periodically communicating with an electronic meter of a consumer, and storing the gathered meter reading data by a wireless communication modem; sending the stored meter reading data to a Wireless Gathering Unit (WGU), installed on a ground rising pipe or at a multi-consumer lead-in wire, over a lower wireless mesh network by the wireless communication modem when a Data Concentration Unit (DCU) requests the meter reading data; sending the meter reading data, received from a plurality of wireless communication modems, to the DCU installed in a ground transformer over a higher wireless mesh network by the WGU; and sending the meter reading data, received from the WGU, to an underground high-voltage Distribution Line (DL) according to an FDD power line communication repeating method by the DCU.

The automatic meter reading method may further include obtaining current and voltage values from a secondary side of the ground transformer by the DCU, and calculating a total amount of supplied power on the secondary side of the ground transformer based on the obtained current and voltage values by the DCU; and monitoring power loss and surreptitious use of electricity by comparing the total amount of supplied power calculated with a total amount of power used by consumers and obtained through the WGU by the DCU.

The automatic meter reading method may further include sending the meter reading data, received from the WGU, to an FEP/automatic meter reading server using one or more of a WiBro module, a CDMA module, and a cable modem by the DCU.

sending the meter reading data may include converting the received meter reading data into a single frame and sending the converted meter reading data to the underground high-voltage DL through a neutral line or at least one of R, S, and T-phase lines of the underground high-voltage DL.

sending the meter reading data may be performed using non-contact type couplers installed in the underground high-voltage DL and configured to support FDD power line communication repeating of the DCU.

A T connector may be attached to a communication terminal of the non-contact type coupler in order to simultaneously inject power line communication signals of different frequency bands.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
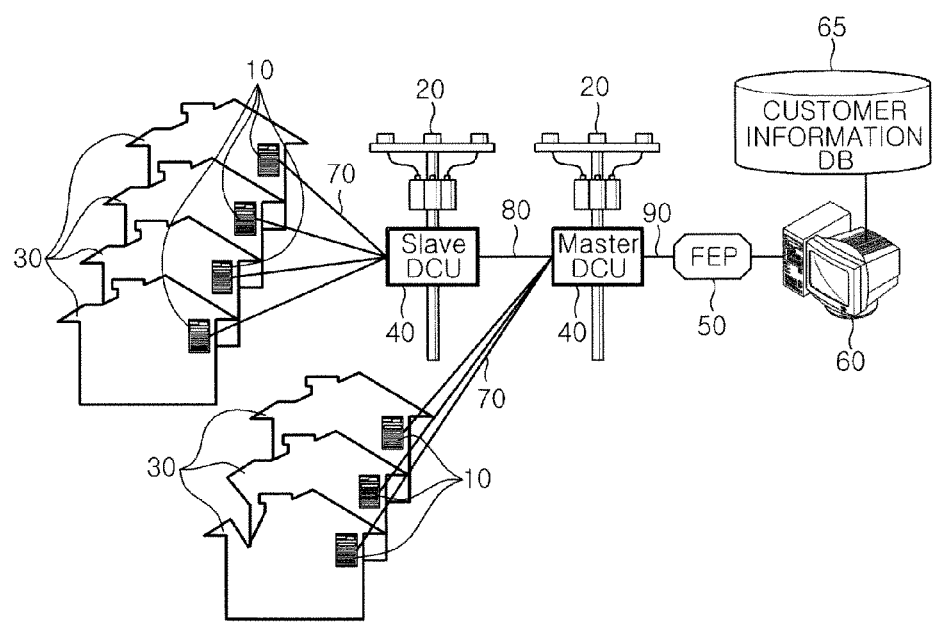
FIG. 1 is a diagram illustrating an existing automatic meter reading system for an overhead section.

The present invention will be described in detail with reference to the accompanying drawings. Here, repeated descriptions and descriptions of known functions and constructions which are deemed to make the gist of the present invention unnecessarily vague will be omitted below. The embodiments of the present invention are provided in order to fully describe the present invention to a person having ordinary skill in the art. Accordingly, the shapes, sizes, etc. of elements in the drawings may be exaggerated for clarity of description.

Hereinafter, an automatic meter reading system employing wired/wireless communication technology according to the embodiment of the present invention is described in detail with reference to the accompanying drawings.

The present invention has been made to solve the problems of the existing automatic meter reading system, and is intended to provide an effective underground section automatic meter reading system, in which in an underground high-voltage section, an FDD repeating power line communication method is applied to a neutral line or a high-voltage power line, thereby enabling long-distance transmission without having to deploying an additional communication line, and in an underground low-voltage section, a wide communication coverage is provided and also multi-hop-based wireless mesh network technology having a network failure recovery function and a process of gathering the amount of energy used between the DCU and the electronic watt-hour meter of a consumer are also improved, thereby being capable of preventing a traffic bottleneck phenomenon.

Figure 2:
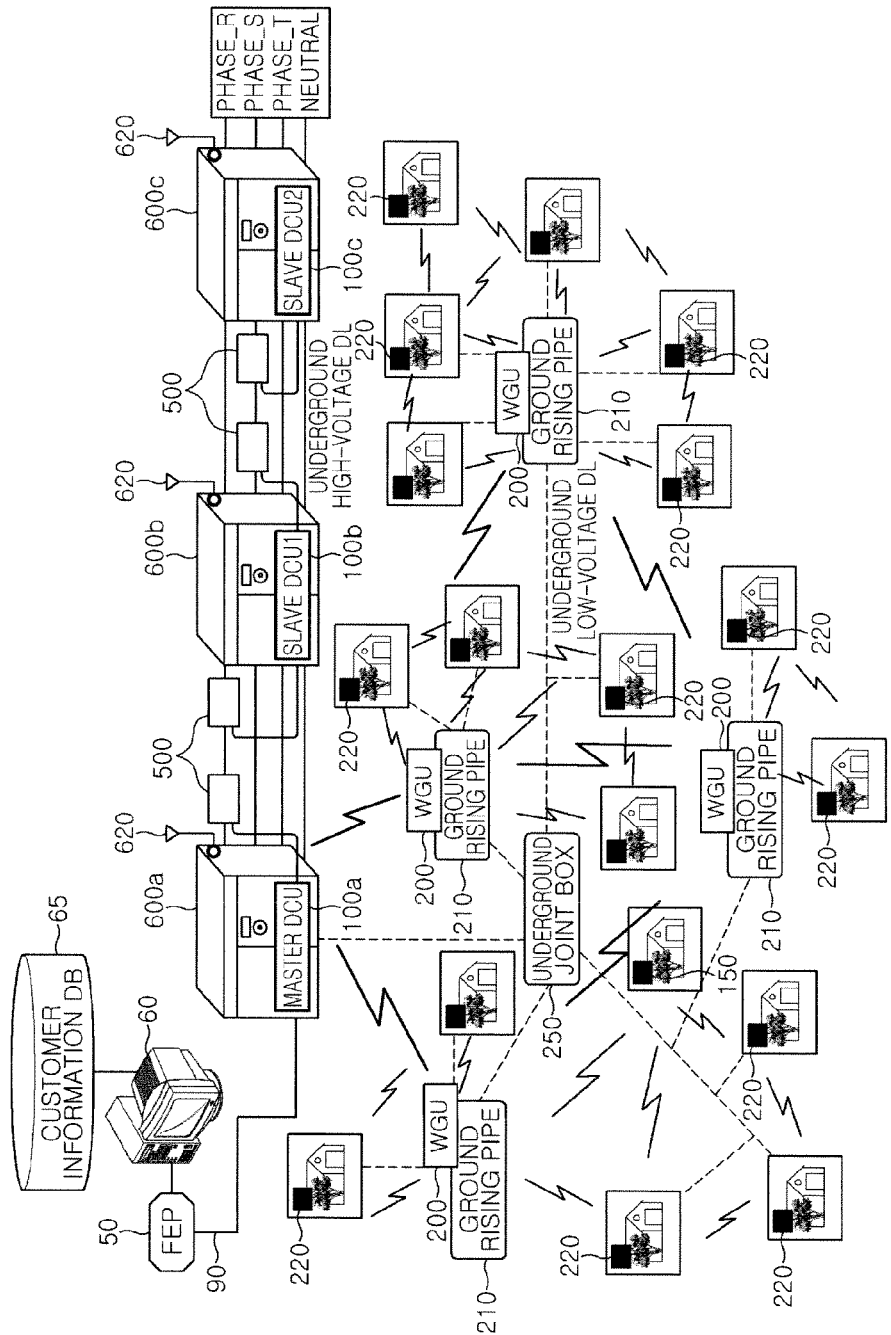
FIG. 2 is a diagram illustrating an automatic meter reading system for an underground distribution line according to the present invention.

FIG. 2 is a diagram illustrating the automatic meter reading system for an underground distribution line according to the embodiment of the present invention.

Referring to FIG. 2, the automatic meter reading system for an underground distribution line according to the present invention includes a customer information DB 65, an FEP/automatic meter reading server 50 and 60, DCUs 100a, 100b, and 100c, Wireless Gathering Units (WGUs) 200, wireless communication modems 220, and non-contact type couplers 500.

The FEP/automatic meter reading server 50 and 60 gather meter reading data (e.g., the amount of energy used) from the DCU 100a, store the gathered meter reading data in the customer information DB 65, and calculate charge information based on energy used by a consumer. Here, the FEP/automatic meter reading server 50 and 60 may be coupled to the DCU 100a over a communication network such as a CDMA, WiBro, or HFC communication network.

The DCUs 100a, 100b, and 100c are installed in respective ground transformers 600a, 600b, and 600c, and send the meter reading data, obtained from the watt-hour meters of the consumers, to a ground high-voltage Distribution Line (DL) according to an FDD power line communication repeating method. For example, the slave DCU 100b may configure a higher wireless mesh network along with the WGU 200, gather the amount of energy used, and send the amount of energy gathered to the master DCU 100a using the FDD power line communication repeating method capable of long-distance transmission.

The WGU 200 is installed on a ground rising pipe 210, and is supplied with power from the ground rising pipe 210. Furthermore, the WGU 200 configures a higher wireless mesh network along with a relevant DCU, and configures a lower wireless mesh network along with the wireless communication modems 220 mounted on the respective electronic watt-hour meters of neighboring consumers. That is, when the wireless communication modem 220 transfers meter reading data, periodically gathered from the electronic watt-hour meter of a relevant consumer and then stored therein, to the DCU, the WGU 200 provides the higher/lower wireless mesh networks.

The non-contact type couplers 500 inject meter reading data into an underground high-voltage power line (R, S, and T-phase lines) or a neutral line or extract the meter reading data from the underground high-voltage power line, in the form of a power line communication signal.

The wireless communication modem 220 periodically gathers the amount of energy used via the electronic watt-hour meter using a DLMS/COSEM meter reading protocol, stores the amount of energy gathered, and transfers the amount of energy used by each consumer to the DCU over the higher and lower wireless mesh networks in response to a request from the DCU.

Meanwhile, the electronic watt-hour meter may be replaced by an electronic meter capable of measuring electricity, water, gas or heat, which is apparent to those skilled in the art.

From the viewpoint of a power company, it is preferred that the electronic watt-hour meter installed at the location of each consumer play the role of the master of various electronic meters. It is preferred that a communication method having a minimum repeating function or a multi-hop mesh function be used between the wireless communication modems 220 coupled internally or externally to the various electronic meters. If an electronic gas meter, an electronic water meter, or an electronic heat meter is unable to directly communicate with the electronic watt-hour meter because of a wireless communication failure, at least one of the electronic gas meter, the electronic water meter, and the electronic heat meter forms a bypass path by playing the role of a relay, and therefore a wide wireless communication service coverage at home and high communication reliability can be provided.

The DLMS/COSEM meter reading protocol may be used for all types of energy, such as electricity, gas, water, and heat. In some cases, a protocol determined by a gas company in regard to gas and a protocol defined by a water supply company in regard to water may be used in the electronic meter and the electronic watt-hour meter section. However, the wireless communication modem 220 attached to the electronic watt-hour meter may use the same DLMS/COSEM protocol in the section from the wireless communication modem 220 to the DCU 100a or the FEP/automatic meter reading server 50 and 60 using a DLMS/COSEM stack, thereby increasing compatible automatic meter reading or service efficiency. As a communication method between in-house heterogeneous meters, a communication method in which a communication method having a repeating or multi-hop mesh function has been added to unlicensed wireless communication, such as WiFi, ZigBee, or binary CDMA communication, is required.

Figure 3:
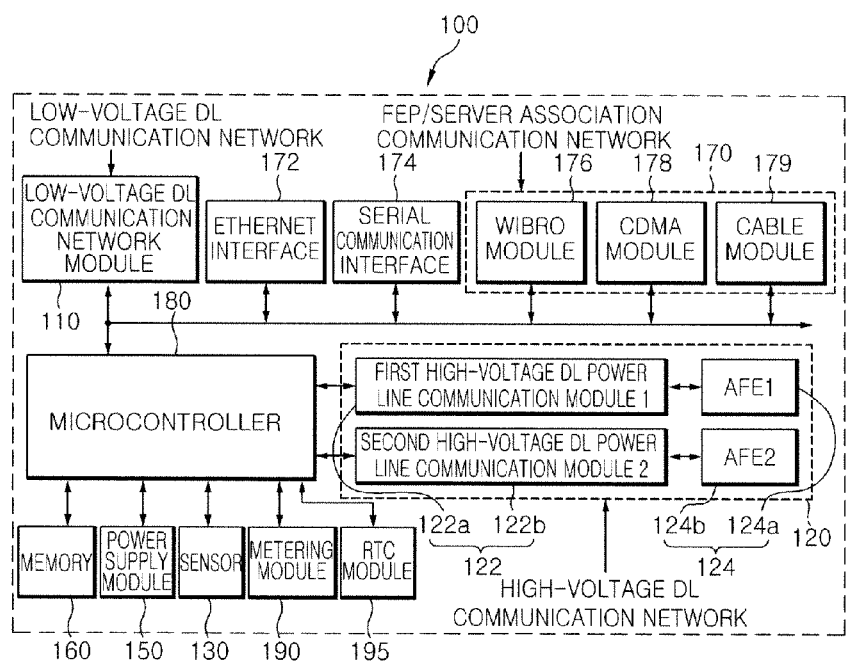
FIG. 3 is a diagram illustrating the construction of the master DCU of the automatic meter reading system for an underground distribution line according to the present invention.

FIG. 3 is a diagram illustrating the construction of the master DCU of the automatic meter reading system for an underground distribution line according to the present invention. The slave DCU has the same construction as the master DCU, and may not include an FEP/server association communication network module 170 in some cases.

Referring to FIG. 3, the master DCU 100 according to the present invention includes a low-voltage DL communication network module 110, a high-voltage DL communication network module 120, a sensor 130, a power supply module 150, memory 160, the FEP/server association communication network module 170, a microcontroller 180, a metering module 190, a Real Time Clock (RTC) module 195, and communication interfaces (Ethernet/serial) 172 and 174.

The low-voltage DL communication network module 110 forms a higher wireless mesh network along with the WGU installed near a ground rising pipe or a multi-consumer lead-in wire in an underground low-voltage DL, and gathers the amount of energy used by each consumer over the higher wireless mesh network.

The high-voltage DL communication network module 120 performs long-distance power line communication with the plurality of slave DCUs 100b and 100c installed in the ground transformers placed in the same ground high-voltage DL.

In order to perform long-distance power line communication, the high-voltage DL communication network module 120 requires a high-voltage DL power line communication module 122 for a high-voltage DL having an FDD repeating function. The high-voltage DL power line communication module 122 for a high-voltage DL includes an Analog/Digital (A/D) converter and a Digital/Analog (D/A) converter for performing A/D conversion or D/A conversion on power line communication signals coming in or going out through the Analogue Front End (AFE) 124 of the high-voltage power line and the neutral line, and a microprocessor (not shown) for playing the role of an Ethernet bridge, performing power line communication modulation/demodulation functions, and controlling and managing the high-voltage DL communication network module.

A current commercial power line communication chip, as shown in FIGS. 7A and 7B, uses a Time Division Duplex (TDD) communication method of alternately performing transmission and reception using a single assigned frequency band (about 1 MHz to 30 MHz) in response to a synchronization signal.

However, an underground high-voltage DL extending from a substation is about 3 to 5 km away although the distance differs depending on an installation area. In order to perform communication using a power line communication method for the entire underground high-voltage DL, it is required to install repeaters for recovering an attenuated and weakened power line communication signal at certain intervals of about 100 to 300 m to perform recovery operation.

The maximum number of TDD method-based repeaters which may be installed for long-distance power line communication is deemed to be 3. The reason for this is that when a signal is recovered using the TDD method-based repeaters, it is difficult to synchronize transmission/reception time slots because of an increase in latency, thereby inevitably resulting in the degradation of communication performance, such as a reduction in the communication speed and a restriction on the maximum transmission distance.

Figure 7:
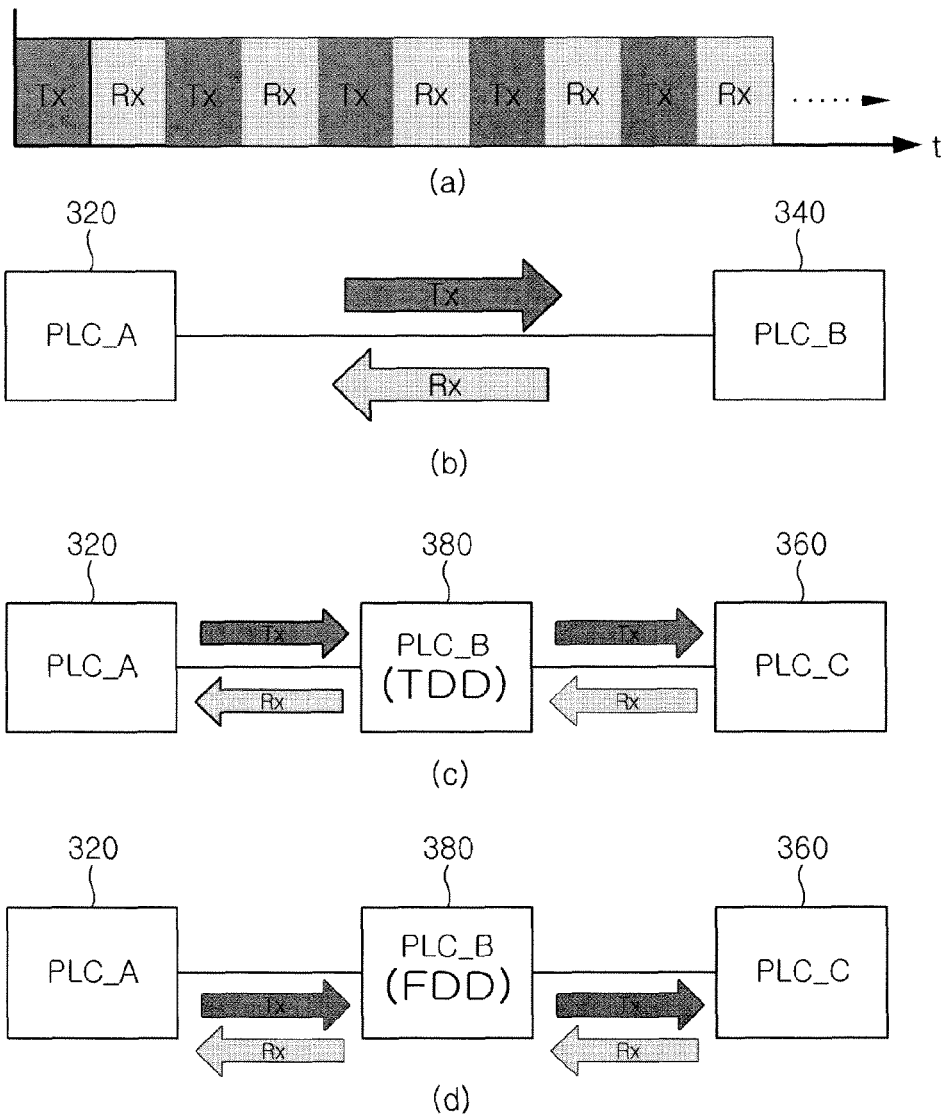
FIG. 7 is a diagram illustrating an FDD repeating method which is applied to the automatic meter reading system for an underground distribution line according to the present invention.

FIG. 7 shows an FDD repeating method capable of solving the above problems.

FIG. 7(a) shows the use of transmission and reception frequencies when TDD communication is performed, and FIG. 7(b) shows the flow of transmission and reception in the time domain. If a TDD repeater, such as a PLC_B 380, is used between a PLC_A 320 and a PLC_C 360 for long-distance communication, as shown in FIG. 7(c), latency occurring between the PLC_A 320 and the PLC_C 360 is twice that of the case where the TDD repeater is not used. Consequently, an increase in the number of TDD repeaters is directly related to an increase in latency. An increase in latency makes it difficult to synchronize transmission/reception time slots, thereby inevitably resulting in the degradation of communication performance, such as a reduction in the communication speed and a restriction on the maximum transmission distance. A serious problem may occur in the Voice over IP (VoIP) or a communication network requiring real-time communication due to such latency. In general, the maximum number of TDD method-based repeaters which may be installed for long-distance power line communication is deemed to be 3 or less. Accordingly, there is a need for another repeating method in order to establish a power line communication-based network for the entire underground DL in the range of 3 to 5 km which is supplied from one substation. In order to solve the above problem, the PLC_B repeater 380 using the FDD method is used between the PLC_A 320 and the PLC_C 360, as shown in FIG. 7(*d*), the PLC_A 320 and the PLC_B 380 perform TDD power line communication using 1 to 10 MHz bands, and the PLC_B 380 and the PLC_C 360 perform TDD power line communication using 20 to 30 MHz bands. In this case, the latency can be reduced by half compared to the case where the TDD repeater is used.

As shown in FIG. 3, the FDD repeater is implemented by connecting a first high-voltage DL power line communication module 122*a* and a second high-voltage DL power line communication module 122*b* in parallel, thereby enabling long-distance transmission. Each of the first and second high-voltage DL power line communication modules is internally connected via a high-speed MII interface, and is controlled by the microcontroller 180 to which a DSP function has been added. The high-voltage DL communication network module 120 performs TDD repeating using only one of the plurality of high-voltage DL power line communication modules 122*a* and 122*b* when FDD repeating is not required.

The microcontroller 180 may include a 32-bit or higher CPU, peripheral I/O interfaces, ROM/RAM (i.e., various data storage units), an Ethernet transceiver, and a switch. The microcontroller 180 separates a low-voltage DL communication network, a high-voltage DL communication network, and an FEP/server association communication network from one another, controls and manages each of the networks, and manages a terminal unit and a node at each of the networks. The networks are logically separated from one another using the switch or gateway function of microcontroller 180.

The microcontroller 180 controls a variety of peripheral devices included in the DCU 100, and calculates, processes, and manages meter reading data gathered from each consumer.

In detail, the microcontroller 180 performs control so that meter reading data obtained from the low-voltage DL communication network module 110 is converted into a single frame and the converted meter reading data is sent to the underground high-voltage DL.

Furthermore, the microcontroller 180 includes a DLMS/COSEM-based meter reading protocol engine, and obtains meter reading data from consumers by periodically requesting the meter reading data from the wireless communication modems which are installed in the electronic watt-hour meters of the consumers.

Furthermore, the microcontroller 180 calculates the total amount of supplied power on the secondary side of the ground transformer based on a current value and a voltage value obtained on the secondary side of the ground transformer, and monitors power loss and surreptitious use of electricity by comparing the total amount of supplied power calculated with the total amount of power used by each consumer which is obtained using the WGU. The microcontroller 180 performs a function for monitoring surreptitious use of electricity of determining whether abnormal use of electricity or an abnormal symptom occurs when a loss rate abruptly changes based on a normal loss rate and informing an operator of the abnormal use of electricity or the abnormal symptom.

The sensor 130 detects temperature, humidity, and a door state in the ground transformer.

The power supply module 150 functions to generate the DC voltage or current necessary to drive the DCU 100 based on the current value and the voltage value which are obtained from the secondary side (e.g., 220/380 V) of the ground transformer, and functions to detect a current value and a voltage value on the secondary side of the ground transformer. Here, it is preferred that the power supply module 150 contain a surge protection circuit and an electromagnetic shielding module.

The memory 160 stores data necessary to operate the DCU 100.

The FEP/server association communication network module 170 compares the total amount of power, used by each consumer and obtained by the microcontroller 180, with the total amount of supplied power which is generated by calculating the current value and the voltage value obtained from the secondary side of the ground transformer, analyzes the results of the comparison, and sends monitoring data about loss and surreptitious use of electricity, generated based on the results of the analysis, and various data related to the amounts of energy used, obtained from the consumer, to the FEP/automatic meter reading server. For this purpose, the FEP/server association communication network module 170 includes a WiBro module 176, a CDMA module 178, and a cable modem 179 in order to achieve extension or operate in conjunction with the FEP/automatic meter reading server.

The metering module 190 calculates active power, reactive power, a power factor, apparent power, and a Load Profile (LP) based on the current value and the voltage value which are obtained from the secondary side of the ground transformer. Here, the metering module 190 generates the above power data by converting the analog current and voltage values on the secondary side of the ground transformer, gathered by the power supply module 150, into digital values using a high-performance ADC and a high-performance Digital Signal Processor (DSP).

The RTC module 195 generates accurate time to be used for the time synchronization of the DCU 100.

Meanwhile, a public IP address is assigned only to the high-voltage DL power line communication module 122 of the WAN master DCU 100*a* by a higher system, and the high-voltage DL power line communication module (not shown) of the slave DCU 100*b* enables a private IP address to be used using a port forwarding method.

Only a single public IP address is necessary for a single underground high-voltage DL, and low-voltage DL communication networks are configured to have the same lower network, so that a network can be easily extended using the private IP address. Accordingly, it is possible to easily extend the network while minimizing the use of an insufficient public IP address.

Figure 4:
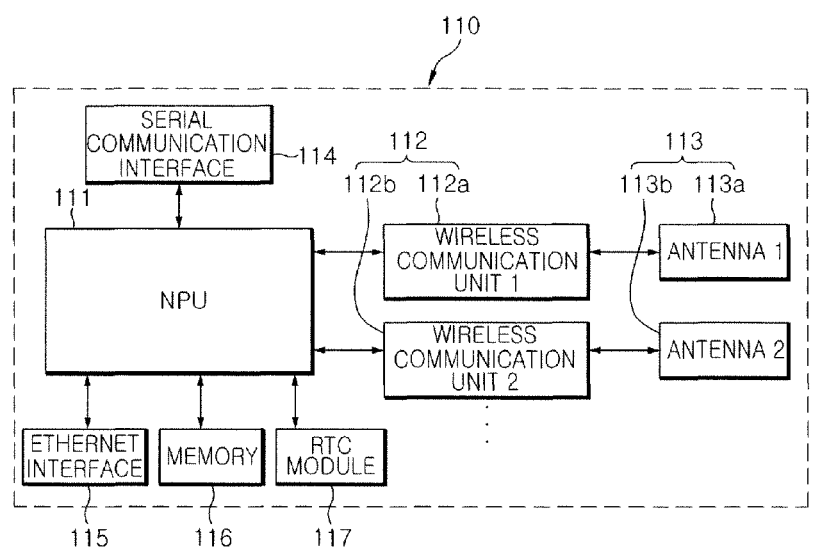
FIG. 4 is a detailed diagram illustrating the construction of the low-voltage DL communication network module of the master DCU.

FIG. 4 is a detailed diagram illustrating the construction of the low-voltage DL communication network module 110 of FIG. 3.

Referring to FIG. 4, the low-voltage DL communication network module 110 according to the present invention includes a Network Processing Unit (NPU) 111, a plurality of wireless communication units 112*a* and 112*b*, antennas 113*a* and 113*b* corresponding to the respective wireless communication units 112*a* and 112*b*, a serial communication interface 114, an Ethernet interface 115, memory 116, and an RTC module 117. The low-voltage DL communication network module 110 is also called a Wireless Mesh Network (WMN) module.

The NPU 111 is a network unit for high-speed data processing, and preferably is a 32-bit or higher MIPS processor. The NPU 111 must be able to perform new programming modification and update and to facilitate flexibility. The NPU 111 implements a mesh protocol such as an IEEE 802.11s-based wireless mesh network service mode and a routing algorithm, and performs a self-healing/self-configuration function using the mesh protocol and an IEEE 802.11e-based QoS function. Alternatively, it is possible to implement a mesh network by mounting an IEEE 15.4-based ZigBee protocol along with or independently of the above mesh protocol. Furthermore, the NPU 111 provides various types of QoS support by establishing an optimum path using the calculation of link costs based on IEEE 802.11 and by providing different priorities according to the type of data packet, and performs general control and management functions for the WMN module.

The wireless communication unit 112 transfers meter reading data, received from the WGU 200 through the plurality of antennas 113, to the NPU 111. The wireless communication unit 112 independently operates in order to improve performance when implementing a higher wireless mesh network. A plurality of wireless communication units is included in the low-voltage DL communication network module 110. The wireless communication unit 112 supports a multi-RF.

Although standards related to the wireless mesh network include WLAN-based IEEE 802.11s, WPAN-based IEEE 802.15.5, WMAN-based 802.16a, and portable Internet-related IEEE 802.20, it is preferred from the viewpoint of the service coverage of the wireless mesh network according to the present invention that the WLAN-based IEEE 802.11s standard or IEEE 802.15.4-based ZigBee technology be used.

The wireless communication unit 112 for a WLAN-based wireless mesh network includes a baseband signal generation unit, a Phase Locked Loop (PLL), a plurality of ADCs and DACs, a plurality of baseband filter units, and a plurality of front end circuits. It is preferred that the wireless communication unit 112 supports IEEE 802.11a/b/g/n standards (i.e., WLAN PHY/MAC standards including MIMO) and that a dual polarization antenna supporting MIMO be used as the antenna 113.

Meanwhile, it is preferable to interface the wireless communication unit 112 and the NPU 111 using a mini-PCI.

The serial communication interface 114 is an interface for the use of a console.

The Ethernet interface 115 includes a gigabit PHY layer, and is used to operate in conjunction with an external WAN.

The memory 116 is formed of flash memory or SDRAM, and stores data necessary for the operation of the low-voltage DL communication network module 110.

The RTC module 117 generates accurate time to be used for the time synchronization of the low-voltage DL communication network module 110.

Figure 5:
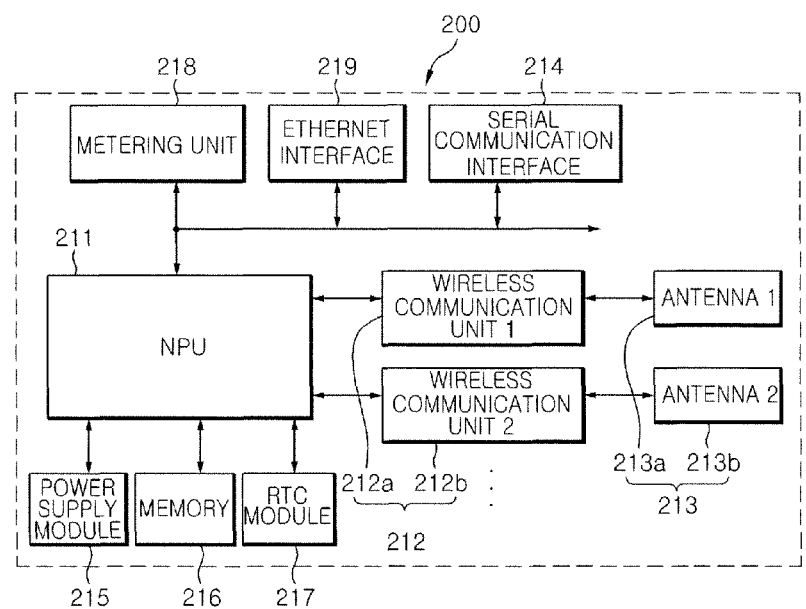
FIG. 5 is a detailed diagram illustrating the construction of the WGU of the automatic meter reading system for an underground distribution line according to the present invention.

FIG. 5 is a detailed diagram illustrating the construction of the WGU 200 of the automatic meter reading system for an underground distribution line according to the present invention.

First, the WGU 200 according to the present invention is installed on a ground rising pipe or at a multi-consumer lead-in wire, forms a lower wireless mesh network along with the wireless communication modems installed in the respective electronic watt-hour meters of consumers, and provides a communication path.

Referring to FIG. 5, the WGU 200 according to the present invention includes an NPU 211, a plurality of wireless communication units 212*a* and 212*b*, antennas 213*a* and 213*b* corresponding to the respective wireless communication units 212*a* and 212*b*, a serial communication interface 214, a power supply module 215, memory 216, an RTC module 217, a metering unit 218, and an Ethernet interface 219.

The NPU 211 implements a DLMS/COSEM meter reading protocol, a mesh protocol such as an IEEE 802.11s-based wireless mesh network service mode and a routing algorithm, and performs a self-healing/self-configuration function using the mesh protocol and an IEEE 802.11e-based QoS function. Furthermore, it is possible to implement a mesh network along with or independently of the mesh protocol by mounting an IEEE 15.4-based ZigBee protocol. Furthermore, the NPU 211 provides various types of QoS support by establishing an optimum path using the calculation of link costs based on IEEE 802.11 and by providing different priorities according to the type of data packet, and performs general control and management functions for the low-voltage DL communication network module.

Furthermore, the NPU 211 performs a function of monitoring power loss and surreptitious use of electricity by comparing the total amount of supplied power on the rising pipe or at the multi-consumer lead-in wire, which is generated by the metering unit 218, with the total amount of power used (i.e., the total sum of the amounts of power used), which is obtained from lower consumers.

The wireless communication unit 212 supports a ZigBee or WLAN based wireless mesh network. The WLAN-based wireless communication unit 212 includes a baseband signal generation unit, a PLL, a plurality of ADCs and DACs, a plurality of baseband filter units, and a plurality of front end circuits and supports IEEE 802.11a/b/g/n standards (i.e., WLAN PHY/MAC standards including MIMO). It is preferred that a dual polarization antenna supporting MIMO be used as the antenna 213.

The serial communication interface 214 and the Ethernet interface 219 are communication interfaces for both the use of a console and external connection.

The power supply module 215 is installed on the ground rising pipe or at the multi-consumer bifurcation point, and functions to generate DC voltage or current necessary for operation and to supply the power necessary for the individual modules of the WGU 200. Furthermore, the power supply module 215 functions to detect a current value and a voltage value on the ground rising pipe or at the multi-consumer lead-in wire. It is preferred that the power supply module 215 contain a surge protection circuit and an electromagnetic shielding module.

The memory 216 stores data necessary for the operation of the WGU 200.

The RTC module 217 generates accurate time to be used for the time synchronization of the WGU 200.

The metering unit 218 calculates active power, reactive power, a power factor, apparent power, and an LP based on the current value and the voltage value which are gathered by the power supply module 215. Here, the metering module 218 generates the above power data by converting the analog current and voltage values on the ground rising pipe or at the multi-consumer lead-in wire, gathered by the power supply module 215, into digital values using a high-performance ADC and DSP.

Figure 6:
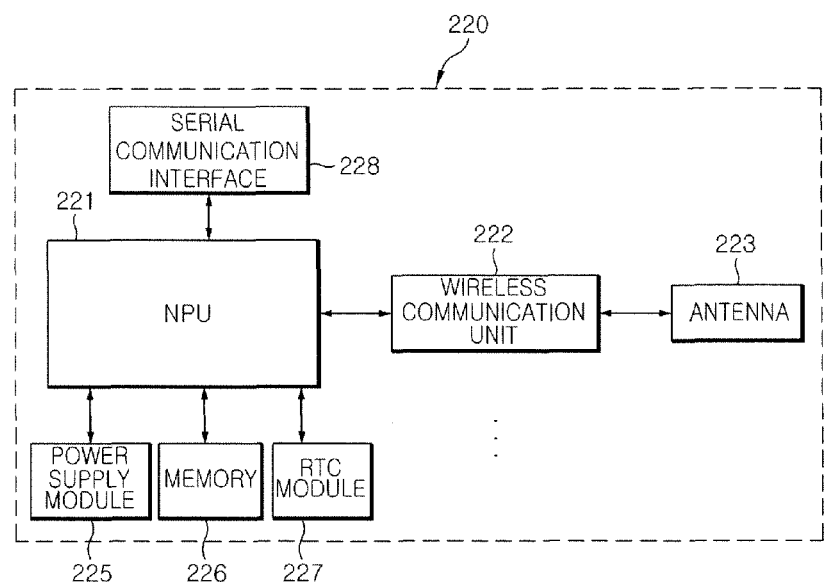
FIG. 6 is a detailed diagram illustrating the construction of the wireless communication modem of the automatic meter reading system for an underground distribution line according to the present invention.

FIG. 6 is a detailed diagram illustrating the construction of the wireless communication modem of the automatic meter reading system for an underground distribution line according to the present invention.

First, the wireless communication modem 220 functions to periodically gather various amounts of energy used from the electronic watt-hour meter of a relevant consumer using the DLMS/COSEM meter reading protocol, store the various amounts of energy gathered, and transfer the various amounts of energy used to the DCU through the WGU 200 when the DCU requests meter reading data. Furthermore, the wireless communication modem 220 establishes the same wireless mesh network as a wireless communication modem, such as neighboring electronic watt-hour meters and gas/water supply/heat value meters. Here, it is preferred that a service coverage in which the WGU 200 can perform communication be extended to the utmost.

Referring to FIG. 6, the wireless communication modem 220 according to the present invention includes an NPU 221, one or more wireless communication units 222 and antennas 223 corresponding to the respective wireless communication units 222, a power supply module 225, a memory module 226, an RTC module 227, and a serial communication interface 228.

The NPU 221 implements a DLMS/COSEM meter reading protocol, a mesh protocol such as an IEEE 802.11s-based wireless mesh network service mode and a routing algorithm, and performs a self-healing/self-configuration function using the mesh protocol and an IEEE 802.11e-based QoS function. Furthermore, it is possible to implement a mesh network along with the mesh protocol or independently of the mesh protocol by mounting an IEEE 15.4-based ZigBee protocol. Furthermore, the NPU 111 provides various types of QoS support by establishing an optimum path using the calculation of link costs based on IEEE 802.11 and by providing different priorities according to the type of data packet, and performs general control and management functions for the WMN module.

The wireless communication unit 222 sends meter reading data (e.g., the amount of energy used), obtained from the electronic watt-hour meter of a relevant consumer, to the WGU 200, and supports a ZigBee or WLAN-based wireless mesh network. The WLAN-based wireless communication unit 222 includes a baseband signal generation unit, a PLL, a plurality of ADCs and DACs, a plurality of baseband filter units, and a plurality of front end circuits, and supports IEEE 802.11a/b/g/n standards (i.e., WLAN PHY/MAC standards).

The power supply module 225 generates the DC voltage and current necessary for operation using power which is supplied from a low-voltage line or the primary side (i.e., a stage prior to current/voltage sensor CP/PT) of an electronic watt-hour meter before the electronic watt-hour meter is installed and supplies necessary power to each of the modules. It is preferred that the power supply module 225 contain a surge protection circuit and an electromagnetic shielding device.

The RTC module 227 generates accurate time to be used for the synchronization of the wireless communication modem 220. The serial communication interface 228 is an interface for the use of a console.

A number of devices including final terminals must be installed in the automatic meter reading system. If the maintenance, management, and upgrade of the devices are performed using human power as in the prior art, enormous expense and time are required. In order to solve the human power problem, there is a need for a method of remotely managing the terminals that constitute the automatic meter reading system. In order to register the terminals with a server, automatic registration based on certificates is preferred to manual registration using human power. After the terminals are registered, they can be managed remotely.

Figure 8:
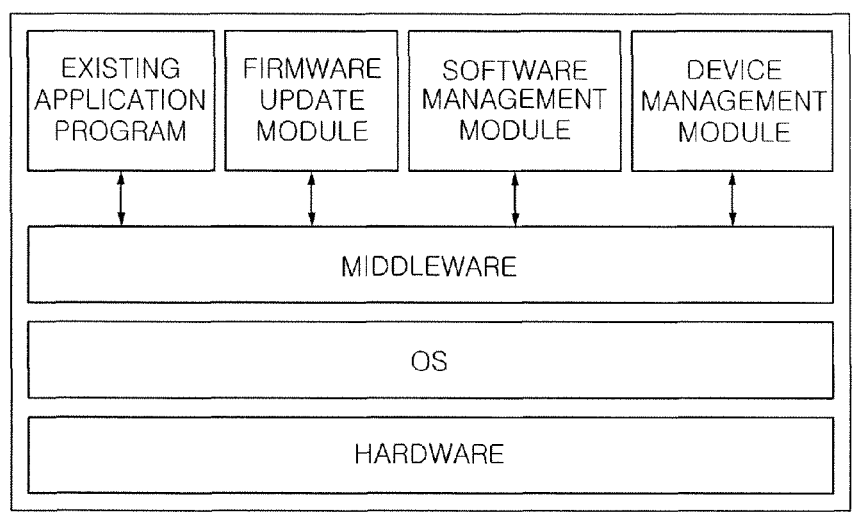
FIG. 8 is a diagram showing a Device Management (DM) S/W stack necessary to remotely and effectively manage the DCU, the WGU, or the wireless communication modem.

FIG. 8 is a diagram showing a Device Management (DM) S/W stack necessary to remotely and effectively manage the DCU, the WGU, or the wireless communication modem.

It is preferred that each of the DCU, the WGU, and the microcontroller or the NPU of the wireless communication modem contain a DM module, a firmware update module, and a software management module.

The DM module gathers various pieces of information from terminals or performs a management function allocated by a meter reading server. That is, if the firmware of the DCU, the WGU, or the wireless communication modem needs to be updated, the automatic meter reading server checks the state of each terminal, and the DM module checks whether service necessary for the firmware update is running and whether there is sufficient memory.

After pre-processing has been performed by the DM module, the firmware update module performs a function of accessing the firmware update server (i.e., the automatic meter reading server), downloading a firmware package from a firmware update server, installing the downloaded firmware, performing rebooting after the update is completed, and informs the DM module and the meter reading server of whether the update is successful after rebooting has completed.

The software management module is similar to the firmware update module, and is configured to download software libraries and a software package, install the downloaded software, and then sends an event for the installations state.

The terminal management technology according to the present invention is configured such that when a problem occurs in each terminal, fixing the entirety is not required, but only a problematic part is fixed. Accordingly, maintenance and management can be performed more efficiently, and the basic functionality of each terminal can be performed regardless of the above task.

The DCU 100a shown in FIG. 2 is installed in the ground transformer 600a. It is preferable to mount the DCU 100a on an iron structure of the inside of the ground transformer 600a by attaching a magnet to the DCU 100a without using fastening tools such as a bolt and a nut.

The high-voltage DL communication network module 120 of the DCU 100a performs power line communication with the high-voltage DL communication network modules which are installed in neighboring ground transformers.

Figure 9:
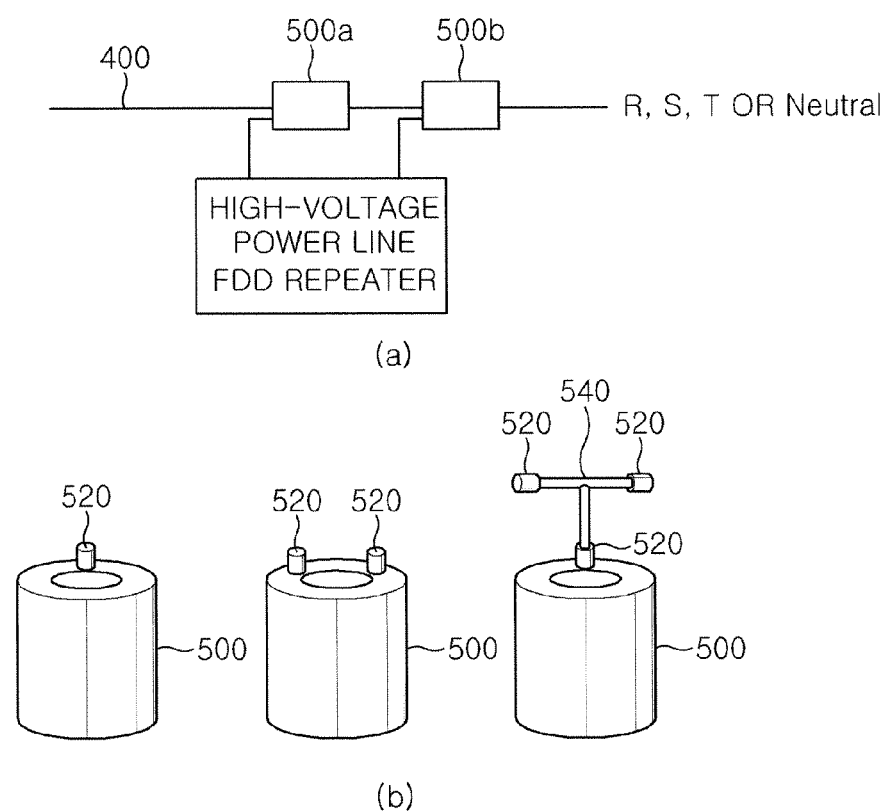
FIG. 9 is a diagram illustrating non-contact type couplers for FDD repeating which are applied to the automatic meter reading system for an underground distribution line according to the present invention.

The high-voltage DL communication network module 122 requires a non-contact type coupler for injecting and extracts signals into and from the high-voltage power line in order to perform power line communication. As shown in FIG. 9, the high-voltage DL communication network module 122 may perform power line communication using one of lines R, S, T, and N (neutral) lines in an underground high-voltage DL (i.e., a 3-phase 4-wire (R, S, T, and N) method. The master DCU 100a sends the meter reading data of consumers, gathered from the slave DCUs, to the FEP/automatic meter reading server 50 and 60 over a communication network, such as an HFC, WiBro, or CDMA communication network.

Referring to FIG. 9, a detailed description will now be given. In order to perform FDD repeating using one of the lines R, S, T, and N in the ground high-voltage line 400 using the 3-phase 4-wire (R, S, T, and N) method, two non-contact type couplers 500a and 500b and a high-voltage power line FDD repeater are required. In order to inject and extract power line communication signals having different frequency bands using one of the non-contact type couplers 500a and 500b, as shown in FIG. 9(b), a non-contact type coupler 500 to which two BNC terminals 520 are attached may be devised. In order to minimize expense by using the existing non-contact type coupler without change, it may be possible to attach and use a T connector.

Figure 10:
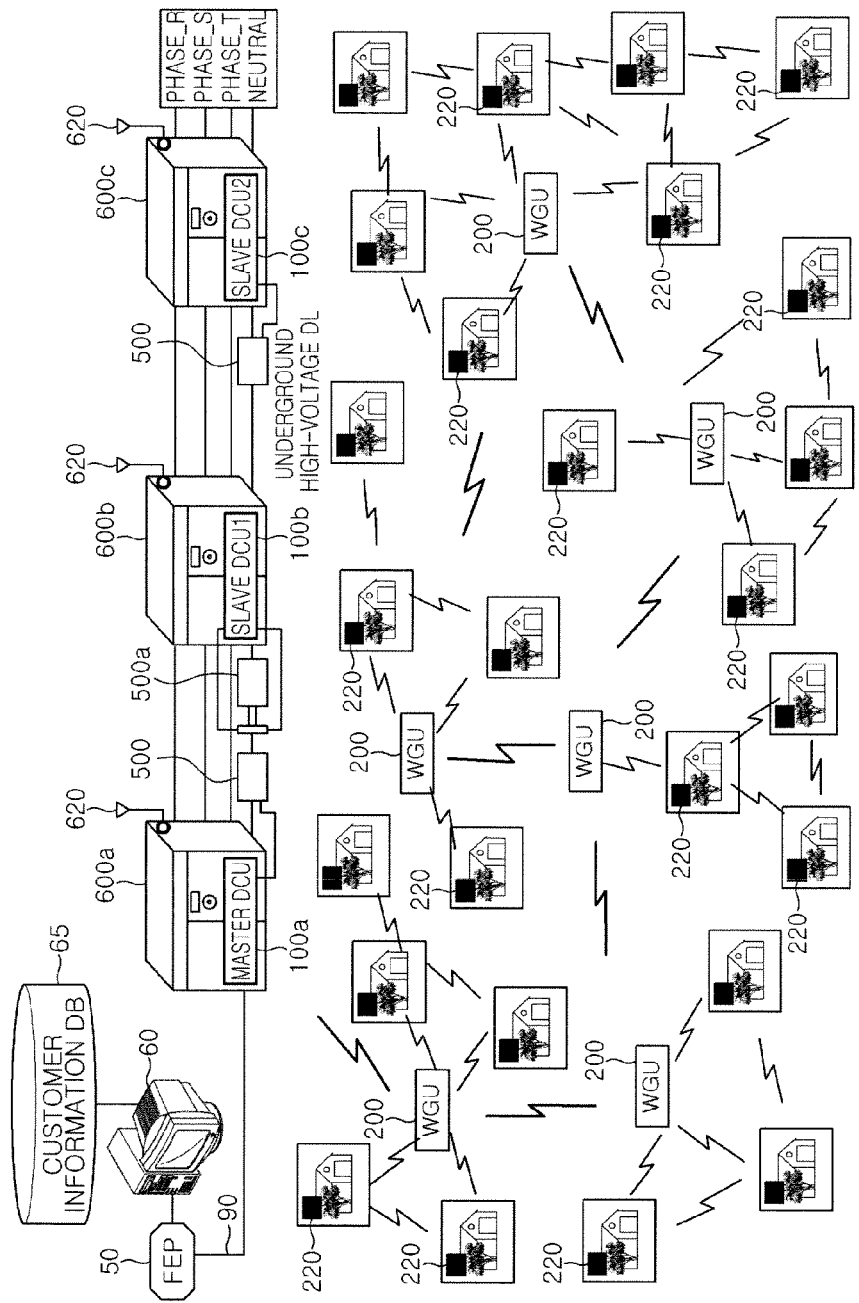
FIG. 10 is a diagram illustrating an automatic meter reading system for an underground distribution line using the non-contact type couplers for FDD repeating shown in FIG. 9.

FIG. 10 is a diagram illustrating an automatic meter reading system for an underground distribution line using FDD non-contact type couplers according to the present invention.

Referring to FIG. 10, in order to perform high-voltage DL long-distance power line communication, an FDD repeating method is applied to the present invention. If the FDD repeating method is performed using the neutral line over the high-voltage DL communication network formed by a first slave DCU1 100*b*, as shown in FIG. 10, the non-contact type coupler 500*a* extracts a power line communication signal (e.g., a frequency band from 1 to 10 MHz) transmitted by the master DCU 100*a*, and simultaneously injects a power line communication signal (e.g., a frequency band 20 to 30 MHz), transmitted by the second slave DCU2 100*c*, into the neutral line. It is preferred to mount a band filter on the DCU externally or internally so that only the desired frequency band can be used.

An advantage of the FDD repeating method is that the S phase or the T phase may be used instead of the R phase if a communication channel is poor because of noise, such as impulse noise, in the R phase of the high-voltage power line between the first slave DCU1 100*b* and the second slave DCU2 100*c*.

In order to inject or extract power line communication signals in different frequency bands using one non-contact type coupler for FDD repeating, as shown in FIG. 9, the non-contact type coupler to which the two communication connectors (i.e., the BNC terminals) are attached may be devised. In order to minimize expense using the existing non-contact type coupler without change, it may be possible to attach and use a T connector.

If the neutral line is used, there is no attenuation of a signal attributable to a shielding layer and a shell, the maximum allowable current value of the non-contact type coupler can be greatly reduced because a minute current flows through the neutral line and a cheap non-contact type coupler can be fabricated and therefore economical efficiency is excellent because nano-crystal elements are utilized.

Figure 11:
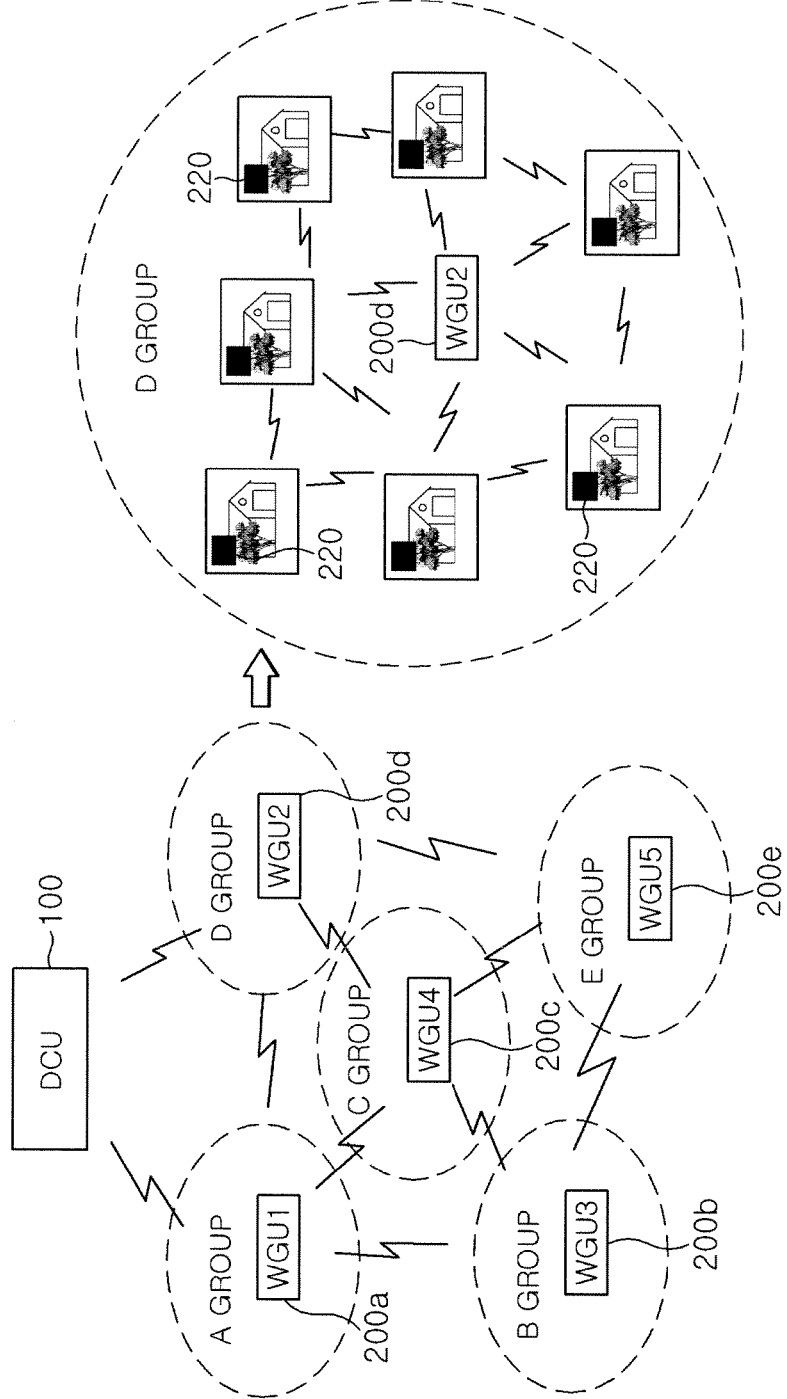
FIG. 11 is a diagram illustrating higher and lower wireless mesh networks according to the present invention.

FIG. 11 is a diagram illustrating higher and lower wireless mesh networks according to the present invention.

As shown in FIG. 11, the low-voltage DL communication network module of the DCU 100 (including a master or slave DCU) forms a higher wireless mesh network along with WGUs 200*a* to 200*e* which are installed around ground rising pipes or consumers, thereby maximizing the automatic meter reading service of an underground low-voltage DL.

It is preferable to use a dual polarization antenna of an inverted planner type as an antenna that is disposed outside a ground transformer. The higher wireless mesh network may use one or more transceivers included in the DCU and the WGU, e.g., a proper frequency band (e.g., a 2.4 GHz RF band or a 5.8 GHz RF band) is selected depending on a distance/an electric wave environment. For example, in FIG. 11, the DCU 100 and the WGU2 200*d* may use a 2.4 GHz RF transceiver, and the WGU2 200*d* and the WGU4 200*c* may use a 5.8 GHz transceiver.

In this relationship, the same band or different RF bands may be used using one or more RF transceivers between the WGUs. A group (cell) around the WGU may be flexibly configured changed depending on the position of the ground rising pipe or the multi-consumer lead-in wire and the number of consumers belonging to the group.

When the WGU service coverage (cell) is determined, the lower wireless mesh, together with the wireless communication modems for the electronic watt-hour meters network, is configured around the WGU. It is preferable to use the unique meter number (i.e., a manufacturing company number+a meter type+a serial number) of the electronic watt-hour meter, defined by a power service provider, without change or a partially modified one as the ID of the lower wireless mesh network.

The RF band of a higher wireless mesh network without change or another RF band may be used as the RF band of the lower wireless mesh network. The higher and lower mesh networks set up a link metric based on the mesh routing algorithm, and provide the optimum connection. When some terminal fails or a communication error occurs, the mesh routing algorithm updates the link metric and selects an optimum path, thereby providing a connection within a short period of time.

Figure 12:
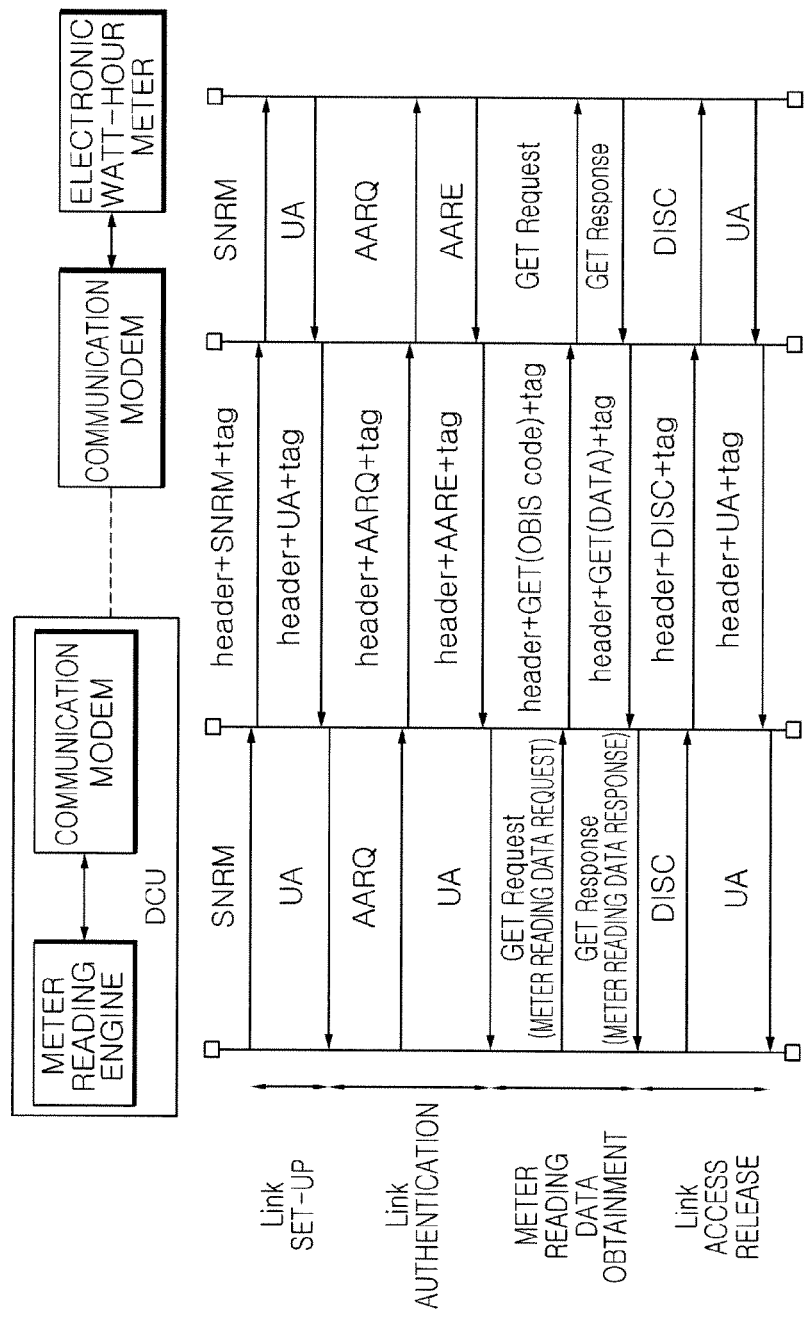
FIG. 12 is a diagram illustrating a communication procedure between the existing DCU and an electronic watt-hour meter.

The automatic meter reading communication protocol most widely used between the DCU and the electronic watt-hour meter is the IEC 62056 (DLMS/COSEM) protocol. As shown in FIG. 12, in order to gather metering data from electronic watt-hour meters, the DLMS/COSEM protocol requires processes, such as access settings and authentication, must perform a complicated procedure of releasing access after obtaining the meter reading data, and must newly start from access settings when a failure occurs. Accordingly, overhead required for data transmission is great.

The DLMS/COSEM meter reading protocol always operates in a server-client model, except for in the case of the notification of an event, and is configured such that a server always responds to a request from a client.

Furthermore, a communication interface between the electronic watt-hour meter and a communication modem (currently, a PLC modem, which is employed in an automatic meter reading business in Korea) uses an IrDA communication method having a maximum speed of 9.6 Kbps. The communication modem (currently, a PLC modem) performs only a bypass function of only encapsulating and decapsulating DLMS/COSEM packets.

That is, the DCU requests metering data from the electronic watt-hour meter using a DLMS/COSEM protocol, and the electronic watt-hour meter sends the meter reading data in response thereto. For example, if the DCU gathers the amount of energy used (i.e., meter reading data having a large size, such as an LP) from the communication modem attached to the electronic watt-hour meters of 200 to 300 consumers for 15 minutes in accordance using a polling method, this procedure has a low meter reading gathering rate because of a traffic bottleneck phenomenon caused between the communication modem and the electronic watt-hour meter, access setting using a DLMS/COSEM method performed in case of a communication error, and the time taken to request meter reading data after authentication.

Figure 13:
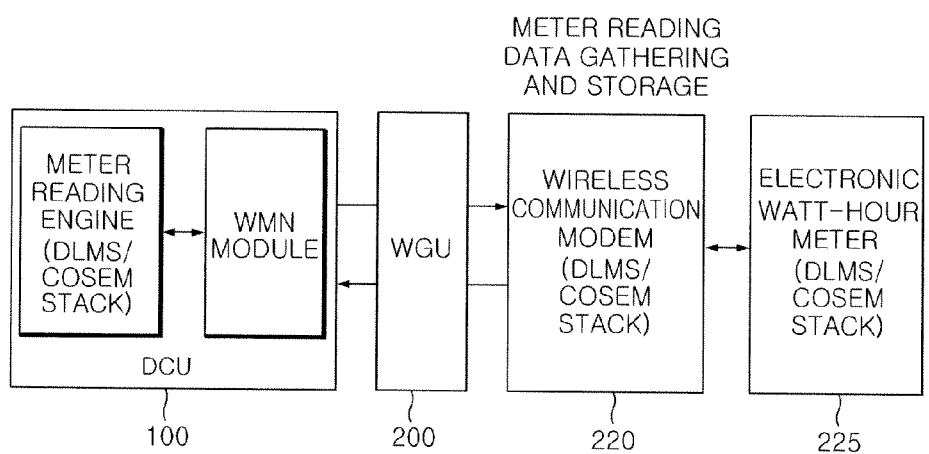
FIG. 13 is a diagram illustrating a communication procedure between the DCU and an electronic watt-hour meter according to the present invention.

Accordingly, there is proposed the following procedure, such as that shown in FIG. 13. In this procedure, not only the ZigBee and IEEE 802.11s mesh protocols but also the DLMS/COSEM protocol are installed on the NPU of the wireless communication modem 220 that communicates with the electronic watt-hour meter 225. The DCU 100 requests meter reading data (e.g., minimum meaningful cycle data generated by the electronic watt-hour meter at the interval of an LP recording cycle) from the electronic watt-hour meter at a certain cycle, like a scheduling function, separately from metering data periodically requested by the DCU 100, while performing authentication and access release after obtaining the meter reading data (i.e., the DLMS/COSEM communication procedure between the wireless communication modem 220 and the electronic watt-hour meter 225). The gathered meter reading data is stored in the wireless communication modem 220. Thereafter, when the DCU 100 requests meter reading data, the meter reading data is not received from the electronic watt-hour meter 225, but the data stored in the wireless communication modem 220 is sent to the DCU 100 through the WGU 200.

In this method, although the speed of communication between the electronic watt-hour meter 225 and the wireless communication modem 220 is not 9.6 Kbps (although it is a speed higher than 9.6 Kbps), a load which occurs when the DCU 100 directly requests meter reading data from hundreds of the electronic watt-hour meters using a polling method according to the DLMS/COSEM protocol can be reduced by the wireless communication modems. Accordingly, a bottleneck phenomenon and an error in meter reading data gathering attributable to latency can be prevented.

According to the above-described present invention, a communication network can be easily deployed in a broadband section in an underground low-voltage DL in which a single high-capacity underground transformer supplies power to about hundreds of consumers. Furthermore, there are proposed the wireless mesh network with a function of automatically recovering a network using the self-healing/self-organization function, and the FDD power line repeating method capable of long-distance communication in an underground high-voltage DL. Accordingly, the present invention has the advantages of improving the accuracy of meter reading data gathering and minimizing the gathering time by combining the two functions with each other and improving the procedure of meter reading data gathering between the DLMS/COSEM protocol-based DCU and the electronic watt-hour meter.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An automatic meter reading system for an underground distribution line using wired/wireless communication, the system comprising:
    at least one Data Concentration Unit (DCU) installed in a ground transformer, and configured to send meter reading data, obtained from an electronic meter of each consumer, to an underground high-voltage distribution line (DL) using a Frequency Division Duplex (FDD) power line communication repeating method;
    at least one Wireless Gathering Unit (WGU) installed on a ground rising pipe or at a multi-consumer lead-in wire, and configured to set up a higher wireless mesh network along with the DCU and to set up a lower wireless mesh network along with wireless communication modems mounted on electronic meters of neighboring consumers; and
    at least one wireless communication modem configured to set up the lower wireless mesh network along with the WGU and the wireless communication modems mounted on the electronic meters of the neighboring consumers, to gather the meter reading data while periodically communicating with the electronic meters of the neighboring consumers, to store the gathered meter reading data, and to transfer the stored meter reading data to the DCU through the WGU when the DCU requests the meter reading data.

2. The automatic meter reading system as set forth in claim 1, wherein the DCU comprises:
    a low-voltage DL communication network module for obtaining the meter reading data about each of the consumers over the higher and lower wireless mesh networks;
    a microcontroller for performing control so that the meter reading data obtained through the low-voltage DL communication network module is converted into a single frame and the converted meter reading data is sent to the underground high-voltage DL; and
    a high-voltage DL communication network module for sending the converted meter reading data to the underground high-voltage DL via a neutral line or at least one of R, S, and T-phase lines in the underground high-voltage DL under a control of the microcontroller.

3. The automatic meter reading system as set forth in claim 2, wherein the microcontroller calculates a total amount of supplied power on a secondary side of the ground transformer based on a current and voltage values obtained from the secondary side of the ground transformer, and monitors power loss and surreptitious use of electricity by comparing the total amount of supplied power with a total amount of power used by the consumers and obtained through the WGU.

4. The automatic meter reading system as set forth in claim 2, wherein the microcontroller comprises a DLMS/COSEM-based meter reading protocol engine, and periodically requests the meter reading data from the wireless communication modem.

5. The automatic meter reading system as set forth in claim 2, further comprising:
    a metering module for calculating active power, reactive power, a power factor, apparent power, and a load profile (LP) based on a current value and a voltage value obtained from a secondary side of the ground transformer; and
    a power supply module for generating a DC voltage or a DC current necessary for operation using power received from the secondary side of the ground transformer, and detecting the current and voltage values of the secondary side of the ground transformer.

6. The automatic meter reading system as set forth in claim 2, wherein the high-voltage DL communication network module comprises:
    a high-voltage power line communication module each for performing a Digital Signal Processing (DSP) function for managing a high-voltage DL communication network, an Ethernet bridge function, power line communication modulation and demodulation, and an FDD repeating function; and
    an AFE each for blocking power supplied through a neutral line or at least one of R, S, and T-phase lines of the underground high-voltage DL and injecting, extracting, and amplifying only a power line communication signal.

7. The automatic meter reading system as set forth in claim 2, further comprising an FEP/server association communication network module for receiving the meter reading data from the microcontroller, and sending the meter reading data to an FEP/automatic meter reading server using one or more of a WiBro module, a CDMA module, and a cable modem.

8. The automatic meter reading system as set forth in claim 2, wherein the low-voltage DL communication network module comprises:
    a plurality of wireless communication units for receiving the meter reading data from the one or more WGUs, installed on a neighboring ground rising pipe or at a neighboring multi-consumer lead-in wire, using a dual polarization antenna that supports MIMO; and a Network Processing Unit (NPU) for transferring the meter reading data of the plurality of wireless communication units to the microcontroller, and supporting IEEE 15.4, IEEE 802.11s, IEEE 802.11e, and IEEE 802.11a/b/g/n protocols.

9. The automatic meter reading system as set forth in claim 1, wherein the WGU comprises:

a power supply module for generating a DC voltage or a DC current necessary for operation using power received from the ground rising pipe or the multi-consumer lead-in wire, and detecting analog current and voltage values on the ground rising pipe or at the multi-consumer lead-in wire; and a metering module for converting the analog current and voltage values, detected by the power supply module, into digital current and voltage values, and calculating active power, reactive power, a power factor, apparent power, and a load profile (LP) based on the converted current and the voltage values.

10. The automatic meter reading system as set forth in claim 9, further comprising a Network Processing Unit (NPU) for calculating a total amount of supplied power on the ground rising pipe or at the multi-consumer lead-in wire based on the current and voltage values converted by the metering module, calculating a total amount of power used based on an amount of power used which is obtained from the wireless communication modems belonging to the lower wireless mesh network, and monitoring power loss and surreptitious use of electricity by comparing the total amount of supplied power calculated with the total amount of power used.

11. The automatic meter reading system as set forth in claim 1, further comprising a non-contact type coupler installed in the underground high-voltage DL and configured to support FDD power line communication repeating of the DCU.

12. The automatic meter reading system as set forth in claim 11, wherein a T connector is attached to a communication terminal of the non-contact type coupler in order to simultaneously inject power line communication signals in different frequency bands.

13. The automatic meter reading system as set forth in claim 1, wherein the DCU comprises a magnet attached to an iron structure of the inside of the ground transformer.

14. An automatic meter reading method for an underground distribution line using wired/wireless communication, the method comprising:

gathering meter reading data while periodically communicating with an electronic meter of a consumer, and storing the gathered meter reading data by a wireless communication modem;

sending the stored meter reading data to a Wireless Gathering Unit (WGU), installed on a ground rising pipe or at a multi-consumer lead-in wire, over a lower wireless mesh network by the wireless communication modem when a Data Concentration Unit (DCU) requests the meter reading data;

sending the meter reading data, received from a plurality of wireless communication modems, to the DCU installed in a ground transformer over a higher wireless mesh network by the WGU; and sending the meter reading data, received from the WGU, to an underground high-voltage Distribution Line (DL) according to an FDD power line communication repeating method by the DCU.

15. The automatic meter reading method as set forth in claim 14, further comprising:

obtaining current and voltage values from a secondary side of the ground transformer by the DCU, and calculating a total amount of supplied power on the secondary side of the ground transformer based on the obtained current and voltage values by the DCU; and monitoring power loss and surreptitious use of electricity by comparing the total amount of supplied power calculated with a total amount of power used by consumers and obtained through the WGU by the DCU.

16. The automatic meter reading method as set forth in claim 14, further comprising sending the meter reading data, received from the WGU, to an FEP/automatic meter reading server using one or more of a WiBro module, a CDMA module, and a cable modem by the DCU.

17. The automatic meter reading method as set forth in claim 14, wherein sending the meter reading data comprises converting the received meter reading data into a single frame and sending the converted meter reading data to the underground high-voltage DL through a neutral line or at least one of R, S, and T-phase lines of the underground high-voltage DL.

18. The automatic meter reading method as set forth in claim 14, wherein sending the meter reading data is performed using non-contact type couplers installed in the underground high-voltage DL and configured to support FDD power line communication repeating of the DCU.

19. The automatic meter reading method as set forth in claim 18, wherein a T connector is attached to a communication terminal of the non-contact type coupler in order to simultaneously inject power line communication signals of different frequency bands.

* * * * *